Patented Sept. 11, 1928.

1,684,317

UNITED STATES PATENT OFFICE.

JOHANNES FRANS KAREL HARMS, OF AMSTERDAM, NETHERLANDS, ASSIGNOR TO JONKHEER MEESTER DOCTOR JELLE BOELOF CLIFFORD KOCQ VAN BREUGEL, OF DRIEBERGEN, NETHERLANDS.

ARC WELDING SYSTEM.

Application filed February 24, 1927, Serial No. 170,584, and in the Netherlands February 11, 1927.

Arc-welding by means of alternating current has the advantage, over arc-welding by means of direct current, in that the welding apparatus may be connected, through a transformer, to the eccentric network. However, since the welding apparatus consumes a very large current, it is impossible to obtain an approximately uniform load on the phases of a rotary current network, which fact has led many electricity works to exclude welding apparatus from the current supply.

Various suggestions have already been offered to avoid this inconvenience. Inter alia, it has been proposed to use, for the welding operation, an electrode composed of two bars or rods insulated from one another and to connect the three phases of the network to the workpiece and to the two said electrodes, respectively. In this case, an additional arc is formed between the two electrodes, but this is rather a disadvantage than an advantage.

The object of my invention is a welding apparatus, which does not cause any appreciable variation in the load of the network and which, moreover, produces a remarkably steady and uniform arc. With this object in view, I use two transformers, each connected to two phases of the network, and to couple the secondary windings to derive the welding current therefrom.

Figure 1:
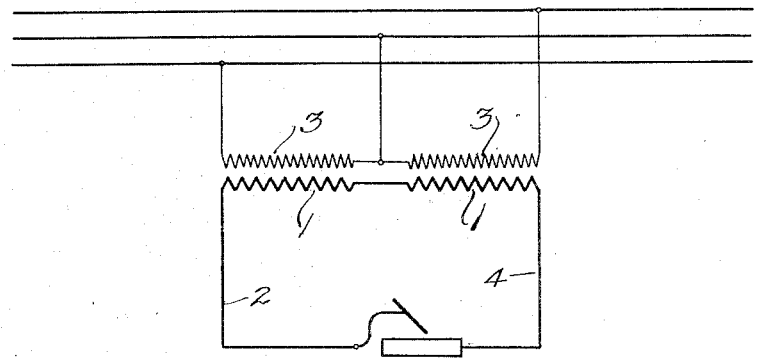

The annexed drawing illustrates, diagrammatically and by way of example only, three different embodiments of my invention. In the embodiments shown in Figs. 1 and 2, the secondary windings 1 of both transformers are connected in the same manner as are the primary windings 3. According to Fig. 1, one welding cable 2 is connected to one end, the second welding cable 4 to the other end of the combined secondary winding, but according to Fig. 2, the secondary windings 1 have their ends connected together and to only one of the welding cables 4, the other welding cable 2 being connected to a point intermediate between the secondary windings. In the arrangement shown in Fig. 3, leads 5 of the secondary windings 1 are connected together and to one welding cable.

Figure 2:
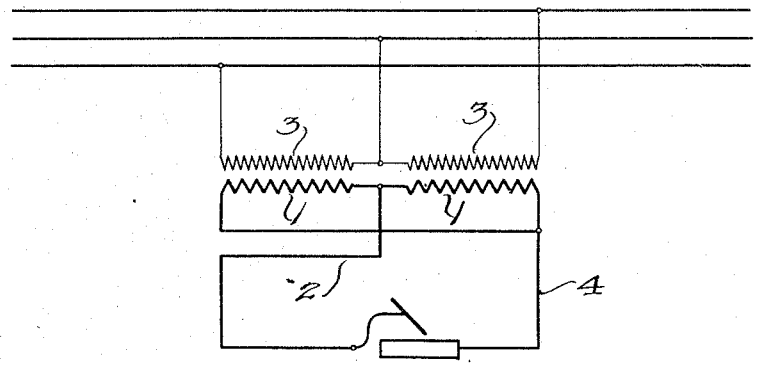
Figure 3:
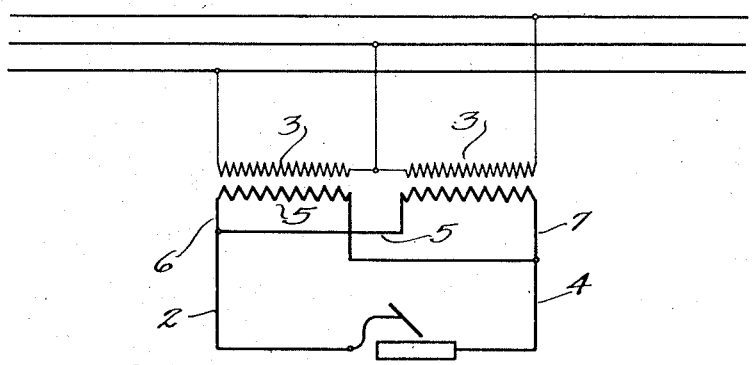

As compared with the arrangement shown in Fig. 2, the one according to Fig. 3 has the advantage of reduced losses, the welding currents being equal.

The two transformers may be separate units, or be combined into one aggregate. I recommend the use of an auxiliary resistance, which is put in and out of circuit alternately with the welding arc, whereby sudden variations in the voltage are avoided.

What I claim is:—

1. An alternating current arc welding apparatus, comprising a plurality of transformers, each of said transformers having a primary winding and a secondary winding, said primary winding of each transformer being adapted to be connected across each phase of a poly phase alternating current source of supply, said secondary windings being in series with each other, and a work circuit connected to said secondary windings.

2. An alternating current arc welding apparatus, comprising a plurality of transformers, each of said transformers having a primary winding and a secondary winding, said primary winding of each transformer being adapted to be connected across each phase of a poly phase alternating current source of supply, said secondary windings being connected in parallel, and a work circuit connected to said secondary windings.

3. An alternating current arc welding apparatus, comprising a plurality of transformers, each of said transformers having a primary winding and a secondary winding, said primary winding of each transformer being adapted to be connected across each phase of a poly phase alternating current source of supply, said secondary windings being connected in reverse parallel relation with each other, and a work circuit connected to said secondary windings.

In testimony whereof I affix my signature.

JOHANNES FRANS KAREL HARMS.